(12) United States Patent
Martini et al.

(10) Patent No.: US 9,242,588 B1
(45) Date of Patent: Jan. 26, 2016

(54) LAWN AND GARDEN CART WITH PIVOTABLE TOW BAR AND CONTAINER

(71) Applicant: OHIO STEEL INDUSTRIES, INC., Columbus, OH (US)

(72) Inventors: Thomas P. Martini, Gahanna, OH (US); Patrick Montag, Columbus, OH (US); Michael Podrosky, Columbus, OH (US)

(73) Assignee: OHIO STEEL INDUSTRIES, INC., Columbus, OH (US)

( * ) Notice: Subject to any disclaimer, the term of this patent is extended or adjusted under 35 U.S.C. 154(b) by 0 days.

(21) Appl. No.: 14/734,349

(22) Filed: Jun. 9, 2015

Related U.S. Application Data

(60) Continuation of application No. 13/953,455, filed on Jul. 29, 2013, now Pat. No. 9,056,573, which is a division of application No. 12/875,032, filed on Sep. 2, 2010, now Pat. No. 8,496,298.

(60) Provisional application No. 61/239,147, filed on Sep. 2, 2009.

(51) Int. Cl.
*B60P 1/12* (2006.01)
*B60P 1/04* (2006.01)

(52) U.S. Cl.
CPC ........................................ *B60P 1/04* (2013.01)

(58) Field of Classification Search
CPC ........................................................ B60P 1/04
USPC .............. 298/5, 9, 10, 17 R, 17 T, 38, 17 SG; 280/479.3, 493, 494; 414/482, 483, 414/485
See application file for complete search history.

(56) References Cited

U.S. PATENT DOCUMENTS

| | | | |
|---|---|---|---|
| 328,981 | A | 10/1885 | Sturgis |
| 1,497,478 | A | 6/1924 | Bludworth |
| 3,501,169 | A | 3/1970 | Nutt, Jr. |
| 3,936,070 | A | 2/1976 | Owings |
| D249,138 | S | 8/1978 | Butler |
| 4,126,324 | A | 11/1978 | Browning |
| 4,417,765 | A | 11/1983 | Wirsbinski |
| D286,992 | S | 12/1986 | Doering |

(Continued)

OTHER PUBLICATIONS

Brochure, "Polar Trailer" available from CLAM Corporation, Inc. of Medina, MN; one page.

(Continued)

*Primary Examiner* — Stephen Gordon
(74) *Attorney, Agent, or Firm* — James R. Eley; Eley Law Firm Co, LPA

(57) ABSTRACT

A tow bar for selectively securing a pivotable container assembly of a dump cart includes a tow bar rotatably connected to a frame of the container assembly. A latch is adjacent to a receiving surface of the tow bar, and includes a slidable member, a biasing element and a lever. The slidable member is configured to selectively engage an arm which extends from the container assembly and for latching the container assembly in a loading condition. The biasing element is configured to urge the slidable member into engagement with the arm. The lever is coupled to the tow bar, slidably coupled to the slidable member and includes an actuation plate spaced apart from the receiving surface. When actuated, the lever moves the actuation plate toward the receiving surface and urges the slidable member away from the arm, enabling release of the engaged arm from the tow bar.

19 Claims, 10 Drawing Sheets

(56) References Cited

U.S. PATENT DOCUMENTS

| | | |
|---|---|---|
| 4,789,171 A | 12/1988 | Porter |
| 5,318,315 A | 6/1994 | White et al. |
| 5,395,163 A | 3/1995 | Mandell et al. |
| 5,544,944 A | 8/1996 | Keech |
| 5,915,706 A | 6/1999 | Mosley |
| 6,213,482 B1 | 4/2001 | Yemini |
| 6,290,301 B1 | 9/2001 | Bockman |
| 6,755,478 B2 | 6/2004 | Messinger-Rapport |
| 7,134,681 B1 | 11/2006 | Jones |
| 7,392,992 B2 | 7/2008 | Stone et al. |
| 7,665,768 B2 | 2/2010 | Duval |
| 8,496,298 B2 * | 7/2013 | Martini .............. B60P 1/04 298/17 T |
| 9,056,573 B1 * | 6/2015 | Martini .............. B60P 1/24 |
| 2002/0054803 A1 | 5/2002 | Schmidt et al. |
| 2007/0164526 A1 | 7/2007 | Martini et al. |
| 2009/0261645 A1 * | 10/2009 | Bellerose .............. B60P 3/122 298/5 |

OTHER PUBLICATIONS

Cover Page, Owner's Manual, Model No. 45-0464 "Poly Dump Cart" available from Agri-Fab of Sullivan, IL., Feb. 2009.

Brochure, "Gorilla Carts" available from Tricam Industries of Eden Prairie, MN; one page.

Manual, Gorilla Carts, Heavy Duty Garden Dump Cart Model #GOR866D, available from Tricam Industries of Eden Prairie, MN.

Owner's Manual, Duty Cart Mfg. No. 085, available from Simplicity Manufacturing Company, Inc. of Milwaukee, WI, Sep. 1964.

\* cited by examiner

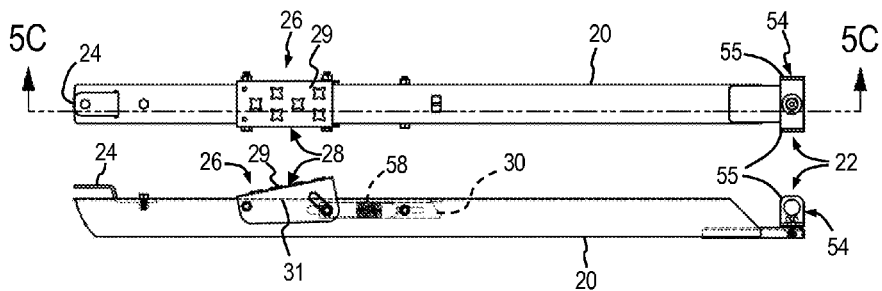
*Fig. 5A*
*Fig. 5B*
*Fig. 5C*
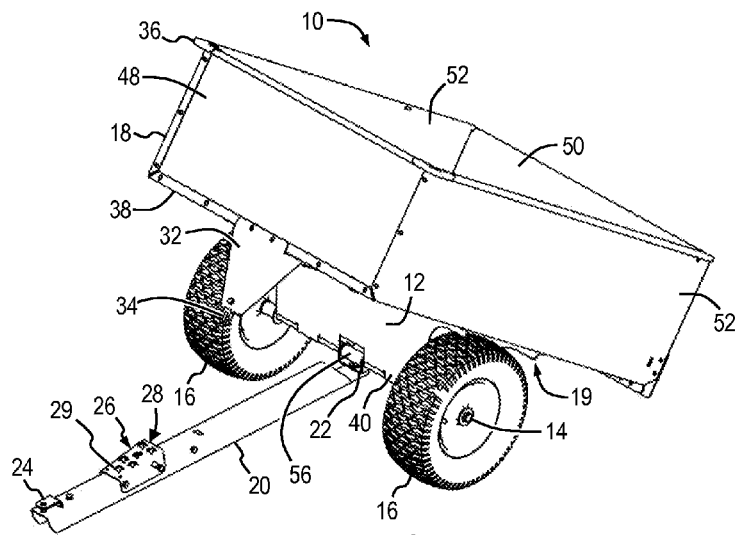
*Fig. 6*

LAWN AND GARDEN CART WITH PIVOTABLE TOW BAR AND CONTAINER

This application is a continuation of U.S. patent application Ser. No. 13/953,455, filed Jul. 29, 2013, now issuing as U.S. Pat. No. 9,056,573, which is a division of U.S. patent application Ser. No. 12/875,032, filed Sep. 2, 2010, now U.S. Pat. No. 8,496,298, which claims priority to U.S. provisional application 61/239,147, filed Sep. 2, 2009, the entire contents of each of these applications being hereby incorporated by reference.

FIELD

This invention relates to lawn and garden carts, in particular a dump cart having a container that is pivotable with respect to a tow bar of the cart, the tow bar in turn being laterally pivotable with respect to an axle of the cart, and including a biased latch with actuation plate.

BACKGROUND

Various equipment and accessories for use with a lawn tractor are known in the art. In particular, lawn and garden carts are often used as a tool to transport materials such as lawn debris, tools and equipment. Typically, a lawn cart includes an open container that is mounted to a frame and has a base with three or four sides. The frame is in turn supported by two wheels. A tow bar with a hitch extends outwardly from the frame. The hitch is attached to a coupling at the rear of the tractor. Once attached, the cart can be towed about the yard by the lawn tractor to transport the materials loaded into the bed.

A drawback of most current carts is that they must be disconnected from the tractor for dumping, a cumbersome and time-consuming task. In addition, the tow bar is typically rigidly coupled to the axle of the cart, making the cart difficult to maneuver. There is a need for a lawn and garden dump cart with improved maneuverability and a convenient way to dump the contents of the container utilizing a biased latch with actuation plate.

SUMMARY

A tow bar for selectively securing a container assembly of a dump cart in a loading condition is disclosed according to an embodiment of the present invention. The tow bar includes a tow bar rotatably connected to a frame of the dump cart and having a receiving surface generally parallel to a longitudinal axis of the tow bar. A latch is adjacent to the receiving surface and includes a slidable member, a biasing element and a lever. The slidable member is configured to selectively engage a distal portion of an arm. The arm extends from the container assembly and is configured for latching the container assembly in a loading condition. The biasing element is configured to urge the slidable member into engagement with the distal portion to secure the container assembly. The lever is coupled to the tow bar and slidably coupled to the slidable member. The lever includes an actuation plate spaced apart from the receiving surface of the tow bar. When actuated, the lever moves the actuation plate toward the receiving surface and urges the slidable member away from the distal portion, enabling release of the engaged arm from the tow bar. The container assembly is pivotable into an unloading condition in at least one axis with respect to the longitudinal axis of the tow bar upon release of the arm.

In one embodiment a tow bar for selectively securing a container assembly of a dump cart in a loading condition includes a tow bar rotatably connected at a first end to a frame of the dump cart. The tow bar has a receiving surface generally parallel to a longitudinal axis of the tow bar. A latch is adjacent to the receiving surface and includes a slidable member, a biasing element and a lever. The slidable member is configured to selectively engage a distal portion of an arm. The arm extends from the container assembly and is configured for latching the container assembly in a loading condition. The biasing element is configured to urge the slidable member into engagement with the distal portion to secure the container assembly. The lever is pivotably coupled to the tow bar and slidably coupled to the slidable member. The lever includes an actuation plate urged by the biasing element to be spaced apart at an angle greater than zero from the receiving surface of the tow bar. When actuated, the lever moves the actuation plate toward the receiving surface and urges the slidable member away from the distal portion, enabling release of the engaged arm from the tow bar. The container assembly is pivotable into an unloading condition in at least one axis with respect to the longitudinal axis of the tow bar upon release of the arm.

In another embodiment a method of assembly of a tow bar for selectively securing a container assembly of a dump cart in a loading condition is disclosed. The method includes obtaining a tow bar, the tow bar having a receiving surface generally parallel to a longitudinal axis of the tow bar. The method includes rotatably connecting the tow bar to a frame of the dump cart. The method also includes extending an arm from the container assembly, the arm configured for latching the container assembly in a loading condition. The method further includes obtaining a latch and placing the latch adjacent to the receiving surface, the latch having a slidable member, a biasing member and a lever. The method also includes selectively engaging the slidable member to a distal portion of the arm. The method includes urging the slidable member into engagement with the distal portion via the biasing element to secure the container assembly in the loading condition. The method further includes coupling the lever to the tow bar, the lever including an actuation plate spaced apart from the receiving surface of the tow bar. The method also includes slidably coupling the lever to the slidable member. When actuated, the lever moves the actuation plate toward the receiving surface and urges the slidable member away from the distal portion, enabling release of the engaged arm from the tow bar. The container assembly is pivotable into an unloading condition in at least one axis with respect to the longitudinal axis of the tow bar upon release of the arm.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 5A, 5B and 5C show top, side and sectional views respectively of the tow bar of FIG. 4;

FIG. 6 is a perspective view of the cart of FIG. 3;

DETAILED DESCRIPTION

Figure 1:
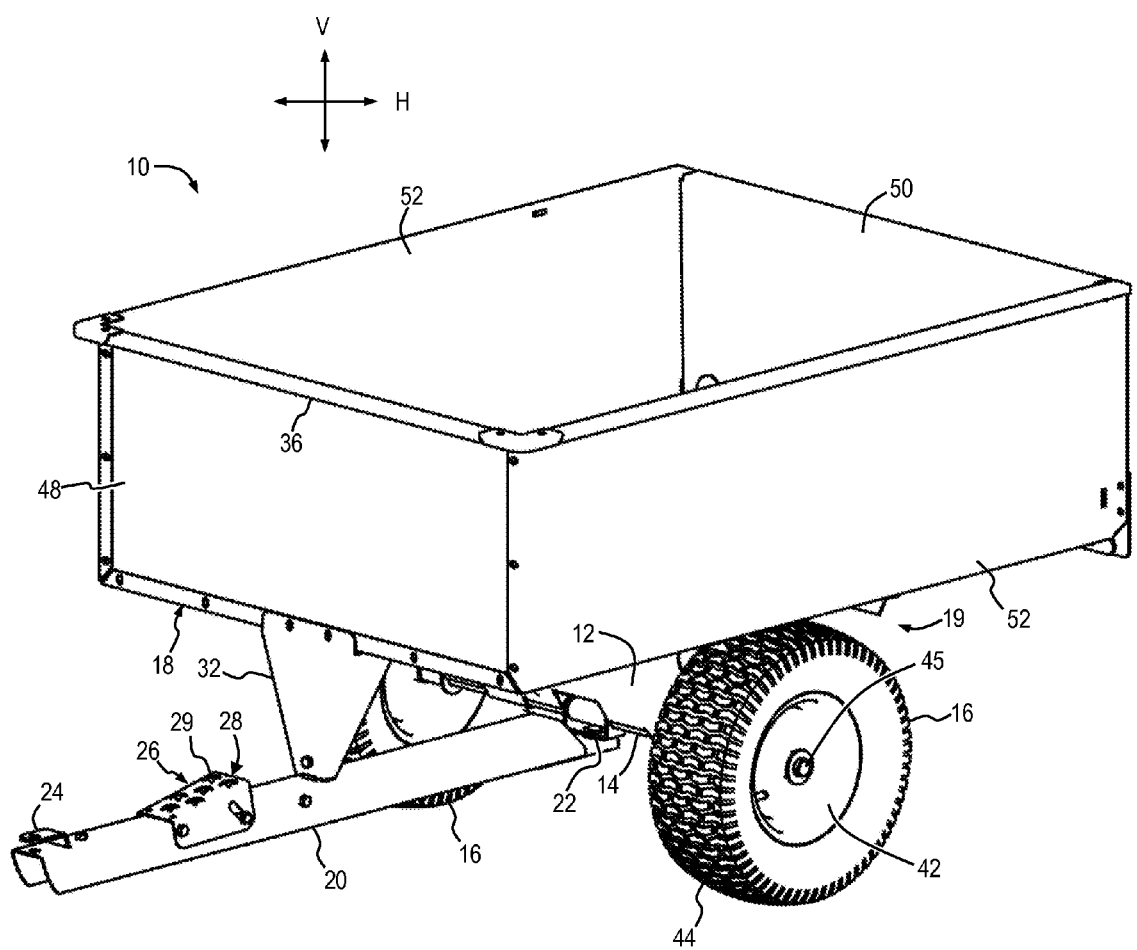
FIG. 1 is a perspective view showing the general arrangement of a lawn and garden dump cart according to an embodiment of the present invention.

In the discussion that follows, like reference numerals are used to refer to like structures in the various figures.

Figure 2A:
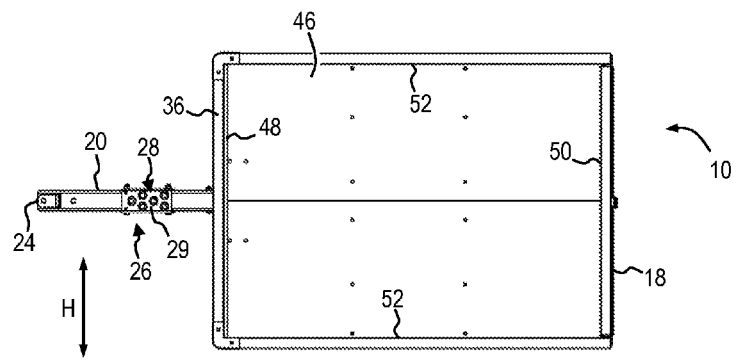
FIGS. 2A, 2B, 2C and 2D are top, side, front and bottom views respectively of the cart of FIG. 1.
Figure 2B:
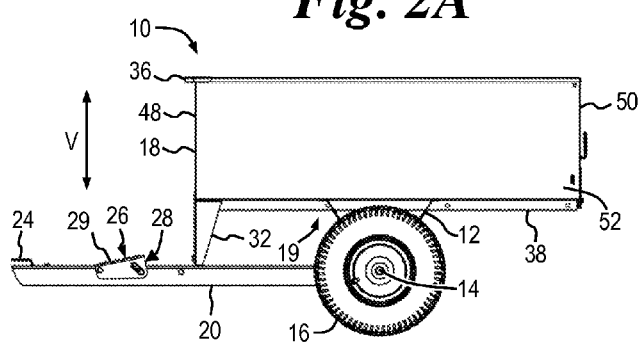
Figure 2C:
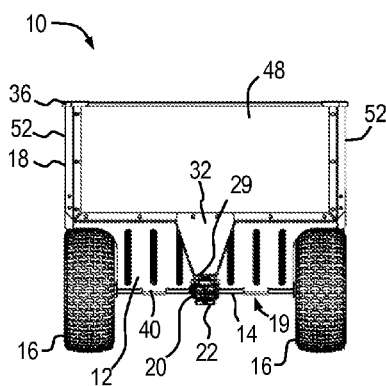
Figure 2D:
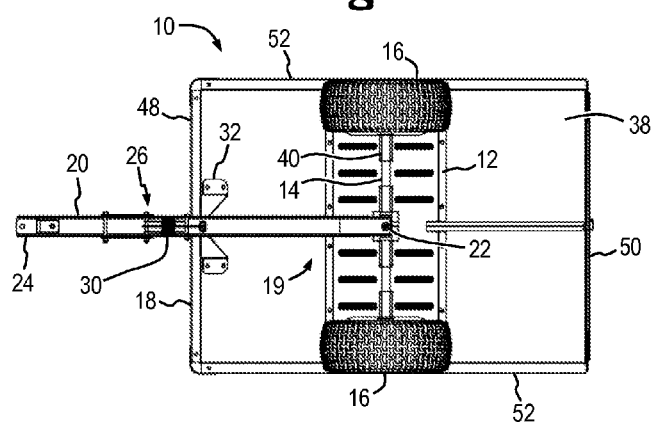
Figure 3:
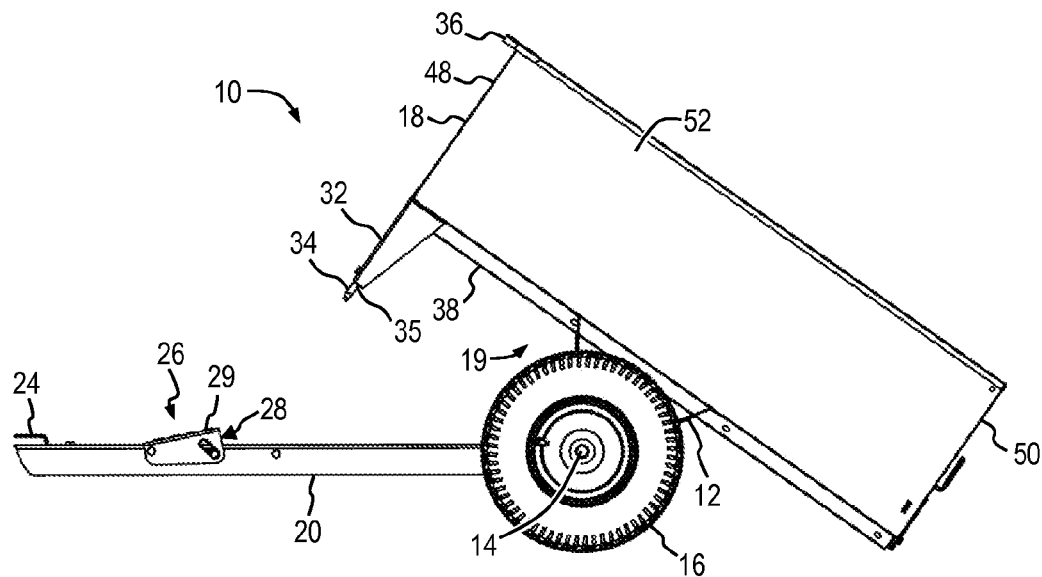
FIG. 3 is a side view of the cart of FIG. 1 with a container assembly of the cart in an unloading condition.

The general arrangement of a lawn and garden dump cart (hereafter "cart") 10 is depicted in FIGS. 1 through 3 according to an embodiment of the present invention. Cart 10 includes a frame 12 having an axle 14 to which a pair of wheels 16 is rotatably attached. A container 18 is also attached to frame 12 to form a container assembly 19. A tow bar 20 is connected to frame 12 by pivotably coupling to axle 14 via a connector 22 at a first end, the connector allowing the tow bar to both pivot and move laterally with respect to the axle. A hitch 24 at an opposing second end of tow bar 20 facilitates coupling of cart 10 to a typical lawn tractor (not shown) or other towing device. Cart 10 also includes a latch 26 having a biased pivotable lever 28 that is coupled to a slidable member 30. Lever 28 further includes an actuation plate 29 located spaced apart from a receiving surface 31 (see FIG. 5B) of tow bar 20. Receiving surface 31 is generally parallel to a longitudinal axis of tow bar 20 and adjacent to latch 26. An arm 32 extends from container assembly 19 and is configured for latching the container assembly in a loading condition. Slidable member 30 is configured to selectively engage a distal portion 35 of arm 32. In one embodiment, arm 32 extends from container 18, distal portion 35 extends into tow bar 20, and the distal portion includes a notched end 34. Notched end 34 is selectably engaged by slidable member 30 to secure arm 32 and container assembly 19 to the tow bar.

Frame 12 receives axle 14 at a first end, while an opposing second end of the frame is attached to an underside 38 of container 18, as shown in FIGS. 2B, 2C and 2D. Frame 12 may be generally V-shaped as shown, or may be made in any other suitable shape within the scope of the invention. Frame 12 may be made from any material or combination of materials suitable for the expected structural load and environment for cart 10 including, without limitation, metal, composites and engineered plastics. In addition, frame 12 may be formed in any conventional manner, such as by molding, casting, machining, cold forming and forging. Frame 12 may be finished in any conventional manner, such as painting, powder coating, plating, or may be unfinished.

Axle 14 is attached to frame 12 with one or more axle connectors 40 and is oriented generally parallel to the underside 38 of container 18, as shown in FIGS. 2B, 2C and 2D. In some embodiments of the present invention axle 14 may be configured to rotate within axle connectors 40 of frame 12. Alternatively, axle 14 may be rigidly coupled to axle connectors 40.

Wheels 16 are attached to opposing ends of axle 14, as shown in FIGS. 2C and 2D. Wheels 16 may include bearings or rotating bushings (not shown) interposed between the wheel and axle 14. Alternatively, wheels 16 may be rigidly attached to axle 14, the axle being rotatable within axle connectors 40 in the manner previously discussed. Wheels 16 may be formed from a unitary piece of any material suitable for the expected structural load and environment for lawn and garden cart 10. Alternatively, wheels 16 may include a rim 42 and a pneumatic or solid tire 44, as shown in FIG. 1. Wheels 16 are preferably removable and may be secured to axle 14 with fasteners 45 (FIG. 1) including, without limitation, bolts, screws, nuts, press-fit caps, lugs and pins.

Container 18 is sized and shaped to receive materials including, without limitation, firewood, lawn debris, fertilizer, soil, tools and equipment. Container 18 may include a bottom 46, a front wall 48, an opposing rear wall 50 and a pair of opposing sidewalls 52. Front wall 48, rear wall 50 and sidewalls 52 may be oriented generally at right angles to bottom 46, as shown in FIGS. 1 through 3. Alternatively, one or more of front wall 48, rear wall 50 and sidewalls 52 may be oriented at an acute or obtuse angle with respect to bottom 46. Container 18 may be made of any material or combination of materials suitable for the expected structural load and environment for cart 10 including, without limitation, metal, composites and engineered plastics. In addition, container 18 may be formed in any conventional manner, such as by molding, casting, machining, cold forming and forging, and may be made as a unitary component or from components and assembled. Furthermore, container 18 may be finished in any conventional manner, such as painting, powder coating, plating, or may be unfinished.

Figure 7:
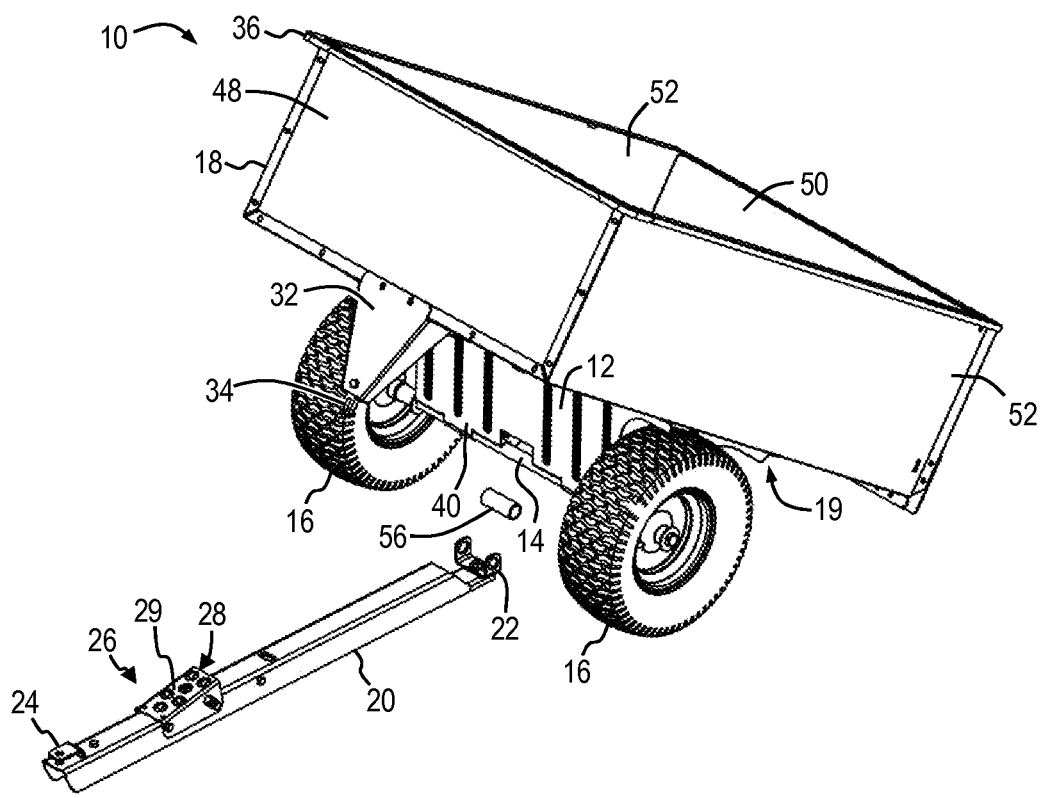
FIG. 7 shows the tow bar of the cart separated from the axle of the cart of FIG. 1.

With reference to FIGS. 4 and 5A, 5B and 5C, tow bar 20 is generally elongate and is attached to frame 12 at a first tow bar end. Tow bar 20 extends outwardly from frame 12 and is detachably engageable with axle 14, the axle being slid through a bracket 54 and disposed between a pair of tabs 55 of the bracket, as depicted in FIGS. 6 and 7. A support spacer 56 may optionally be assembled with bracket 54 on axle 14, as shown in FIGS. 6 and 7. Tow bar 20 may be generally rectangular, having a "U" shape, or may be a closed rectangular box. In other embodiments tow bar 20 may have a generally circular shape. Tow bar 20 may be made of metal, such as steel, or from other materials such as high density plastic and composites.

Figure 4:
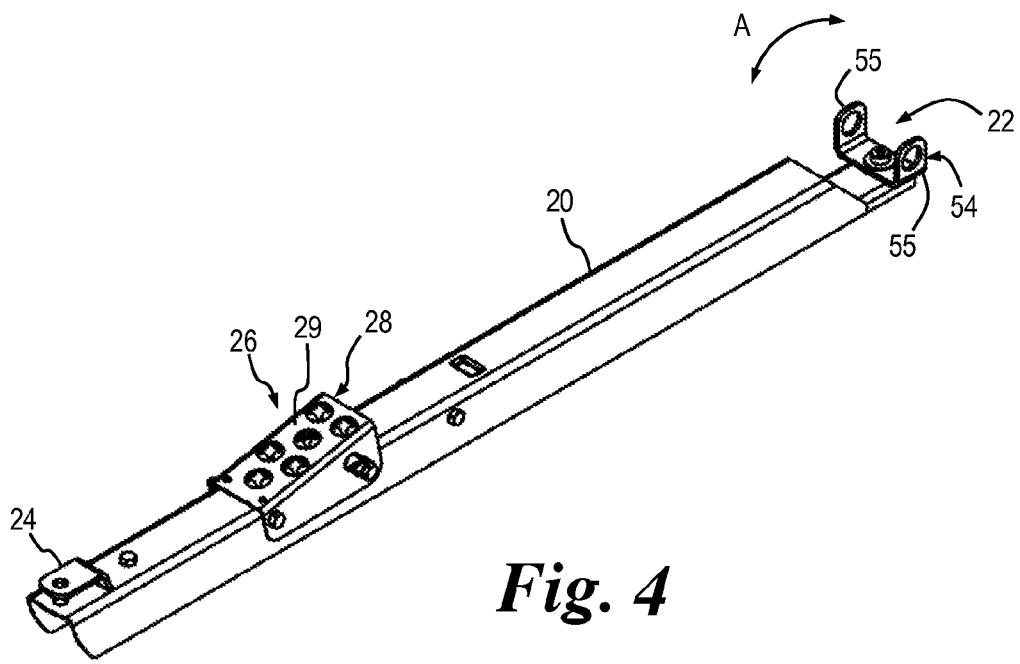
FIG. 4 shows additional features of the tow bar of the cart.
Figure 8:
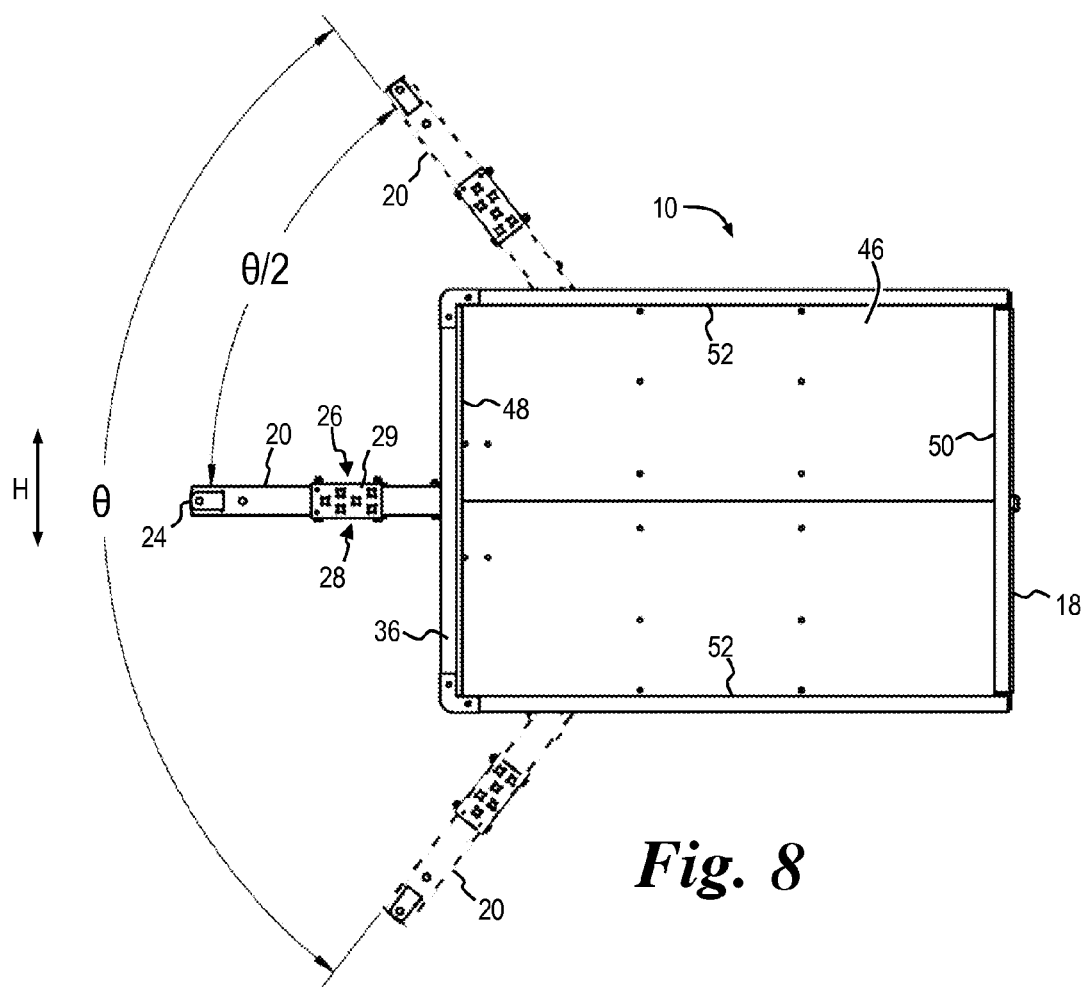
FIG. 8 shows the cart of FIG. 1 with a tow bar that may be moved laterally throughout a range of positions with respect to a towing position.
Figure 9:
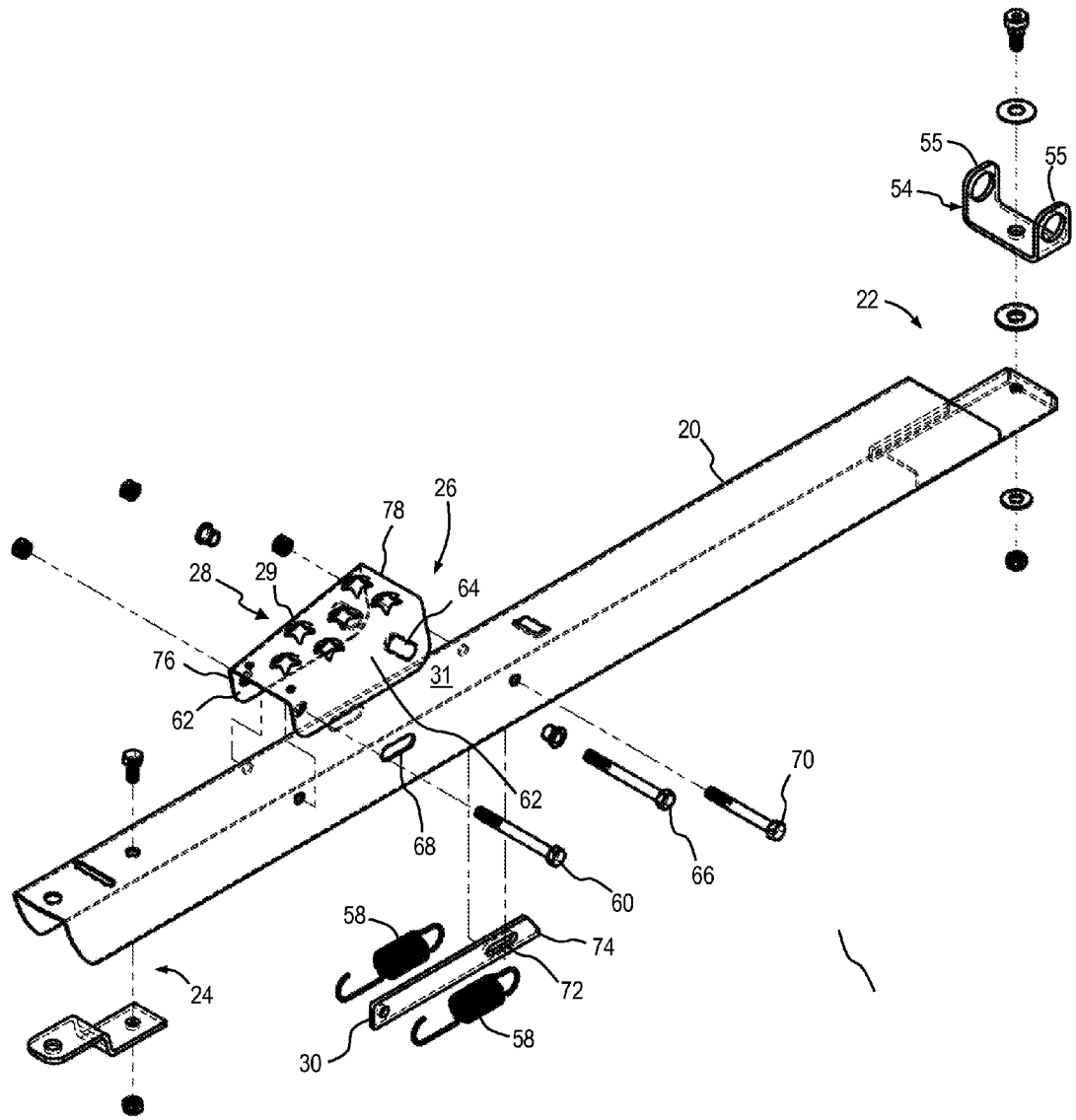
FIG. 9 is an exploded view showing the components of the tow bar of FIG. 4 in greater detail.
Figure 10A:
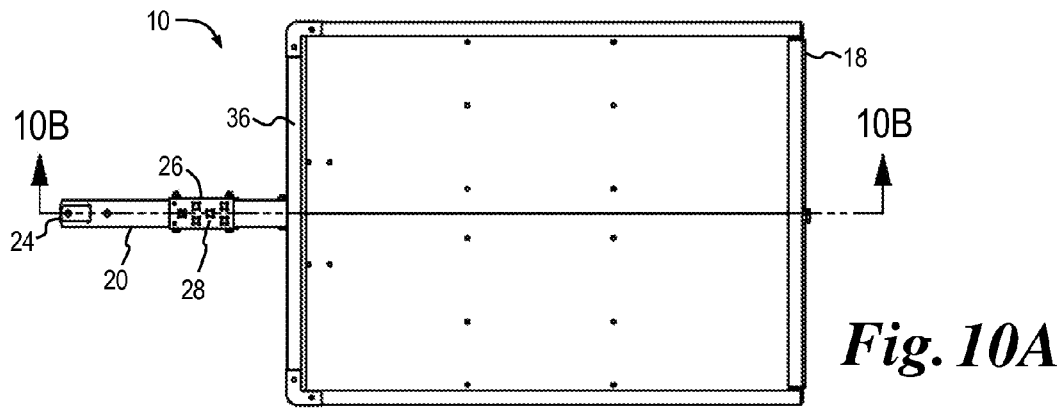
FIGS. 10A and 10B are top and side views respectively of the cart.
Figure 10B:
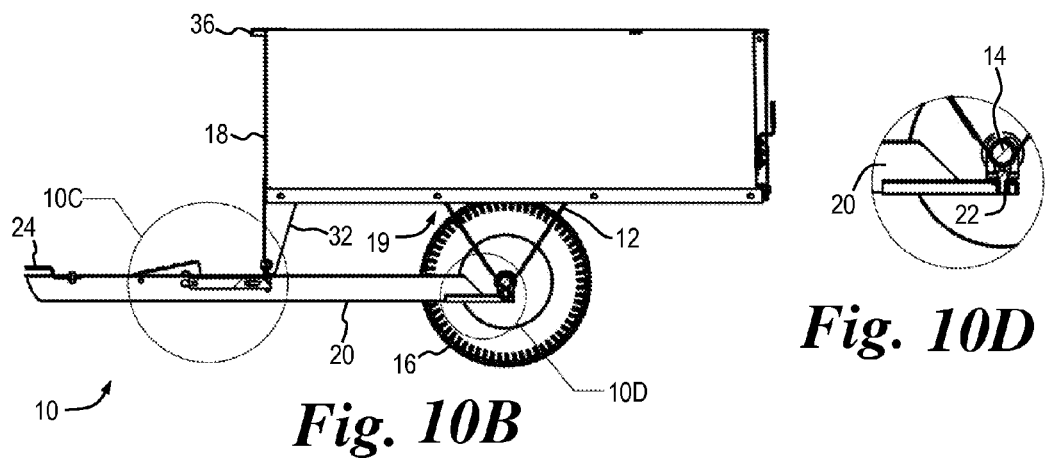
Figure 10D:
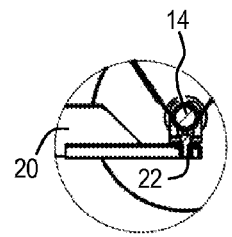
FIG. 10D is a close-up view showing further details of the tow bar connector of the cart.
Figure 10C:
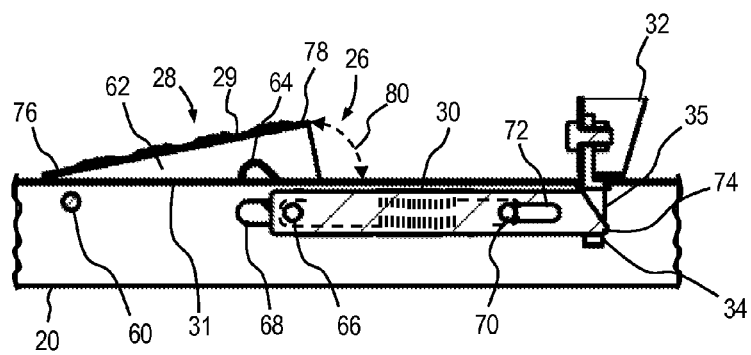
FIG. 10C is a close-up view showing further details of the latch of the cart.

Bracket 54 of tow bar 20 may be made rotatable with respect to the tow bar, as indicated by arrow "A" of FIG. 4. This allows tow bar 20 to be moved laterally within a predetermined range of movement θ as shown in FIG. 8. In one embodiment the lateral movement of tow bar 20 is limited by wheels 16, the tow bar coming into contact with the wheels at opposing lateral extremes. As such, bracket 54 of connector 22 is configured to allow container assembly 19 to pivot in at least one axis with respect with respect to the longitudinal axis of tow bar 20 when arm 32 is released from the tow bar.

As shown in FIG. 1, hitch 24 is located at a second end of tow bar 20 distal to frame 14, and is configured to couple cart 10 to a lawn tractor or other towing device (not shown). Hitch 24 may be of any suitable type including a ball hitch, drawbar hitch, sleeve hitch, and three-point hitch.

With reference to FIGS. 1, 9, and 10A through 10D, latch 26 includes slidable member 30, which is biased by one or more biasing elements 58 that urge the slidable member to engage distal portion 35 of arm 32 extending away from container assembly 19, thereby selectably securing the container assembly to tow bar 20 as shown in FIG. 1. At least a portion of slidable member 30 and biasing elements 58 are located within tow bar 20 in order to shield the moving parts. Latch 26 may include a plurality of spaced apart biasing elements 58 located on opposing sides of the slidable member. When actuated, lever 28 moves actuation plate 29 toward receiving surface 31 and urges slidable member 30 away from the distal portion 35, enabling release of engaged arm 32 from the tow bar. Container assembly 19 is pivotable into an unloading condition in at least one axis with respect to the longitudinal axis of tow bar 20 upon release of the arm. In one embodiment, lever 28 may be pivotably coupled to tow bar 20 with a pivot pin 60 (see also FIG. 4) and is also coupled to slidable member 30 such that, when the lever is operated against the bias of biasing elements 58, the slidable member is urged away from notched end 34, thereby releasing arm 32 (and thus container 18) from tow bar 20. In this condition container 18 is free to pivot or rotate about axle 14, as shown in FIGS. 3 and 6.

Referring again to FIGS. 9 and 10C, lever 28 may include a pair of spaced apart flanges 62 extending generally perpendicular to actuator plate 29 and located adjacent to opposing sides of tow bar 20. Each flange 62 may include an actuator groove 64 configured to receive and to cause slidable movement of an actuator pin 66 during actuation and release of actuation plate 29. Actuator pin 66 is connected to slidable member 30 and slidably coupled to lever 28. Actuator pin 66 is configured to allow slidable member 30 to slide toward the first end of tow bar 20 when actuation plate 29 is released, and toward the second end of the tow bar when the actuation plate is actuated. Preferably, slidable member 30 slides generally parallel to the longitudinal axis of tow bar 20 as actuation plate 29 is moved toward and away from receiving surface 31. Tow bar 20 may include a pair of spaced apart first guide grooves 68 configured to receive actuator pin 66. First guide grooves 68 are configured to allow slidable member 30 to slide during actuation and release of actuation plate 29.

Slidable member 30 is slidably connected to tow bar 20 by a guide pin 70, wherein guide pin 70 is configured to allow slidable member 30 to slide during actuation and release of actuation plate 29. Slidable member 30 may also include at least one second guide groove 72 configured to receive guide pin 70. Second guide groove 72 is configured to allow slidable member 30 to slide during actuation and release of actuation plate 29. Slidable member 30 may also include a protrusion 74 configured to selectively engage notched end 34 to secure arm 32. Once arm 32 is released, and actuation plate 29 is released, slidable member 30 remains biased toward the first end of the tow bar. Protrusion 74 may include a wedge shape configured to self-latch notched end 34 when container assembly 19 is returned to the loading condition. As the uses returns distal portion 35 into tow bar 20, the distal portion cams protrusion 74, sliding slidable member 30 back toward the second end of tow bar 20. As distal portion 35 returns further into tow bar 20 protrusion 74 is able to engage notched end 34 and thus secure container assembly 19 back in the loading condition.

In one embodiment, lever 28 includes a proximal end 76, a distal end 78, and the lever is pivotably coupled to tow bar 20 at the proximal end by pivot pin 60. When not actuated, lever 28 is biased by biasing element 58 such that actuator plate 29 forms a predetermined angle 80 from proximal end 76 to distal end 78 with respect to the receiving surface 31 of tow bar 20. As such, when the container assembly 19 is in the loading condition, lever 28 forms an angle 80 that is greater than zero. As lever 28 is actuated, actuator plate 29 is urged toward receiving surface 31 and predetermined angle 80 decreases toward zero. When lever 28 is actuated to enable unloading of container assembly 19 the distal end 78 rotates toward the first end of tow bar 20.

In use, slidable member 30 is biased to engage notched end 34 of arm 32, thereby securing container assembly 19 to tow bar 20 with the bottom 46 of container 18 oriented roughly parallel to the tow bar and the tow bar extending away from the front of cart 10 (FIG. 1). Hitch 24 is coupled to a lawn tractor or other towing device. Cart 10 may be moved about as needed, container 18 being filled by the user with material as desired.

When it is desired to unload the contents of container 18 a user actuates actuation plate 29 of lever 28, urging slidable member 30 away from notched end 34 of arm 32, thereby releasing the arm from the tow bar. The user may then grasp a front lip 36 of container 18 and pivot the container about axle 14, away from tow bar 20 (FIGS. 3, 6). With latch 26 released and container 18 pivoted away from tow bar 20, the tow bar is further laterally movable with respect to axle 14, allowing the user to maneuver cart 10. For example, the user may simply pivot container 18 away from tow bar 20 on a vertical axis "V" (FIG. 2B) if it is desired to dump the contents of the container straight back. The user may also pivot the tow bar 20 to any lateral angle about a horizontal axis "H" (FIG. 2A) within the range θ with respect to axle 14 (FIG. 8) by means of connector 22 to manipulate the container to a preferred position and then unload the contents to the right or left.

Figure 11:
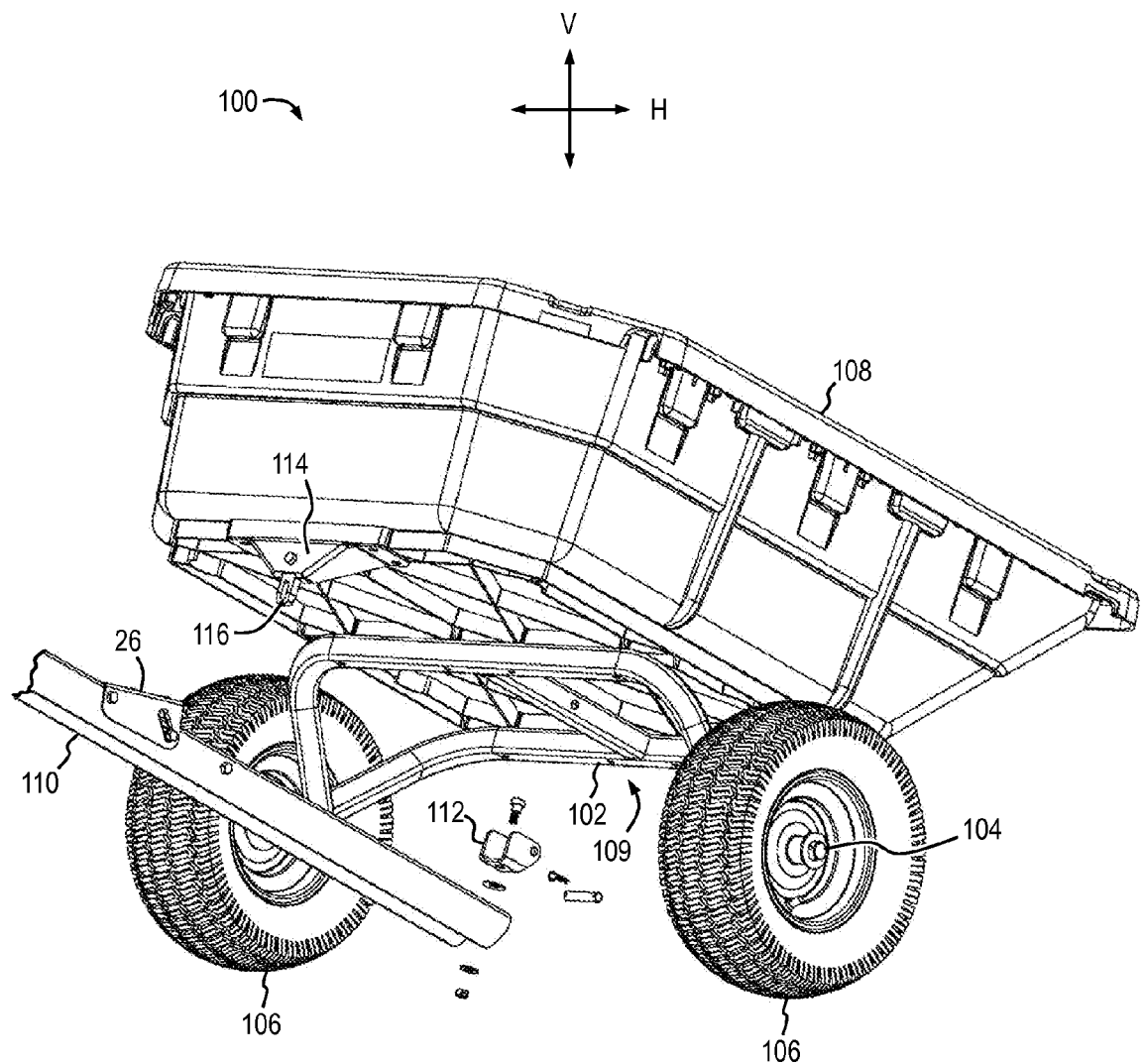
FIG. 11 is a perspective view showing the general arrangement of a lawn and garden dump cart according to another embodiment of the present invention, showing the assembly of a tow bar connector.
Figure 12:
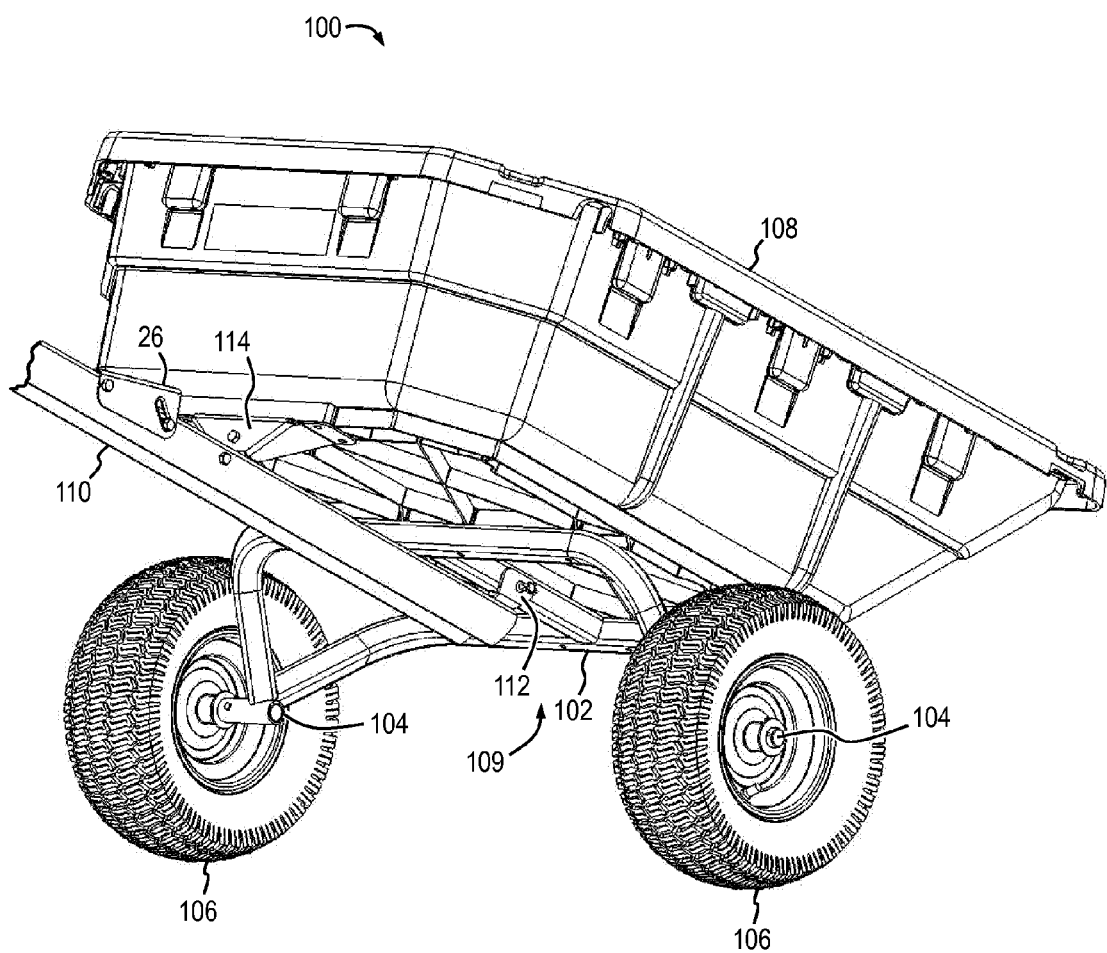
FIG. 12 is a perspective view of the lawn and garden cart of FIG. 11 with the tow bar assembled to the cart.

The general arrangement of a cart 100 is depicted in FIGS. 11 and 12 according to another embodiment of the present invention. Cart 100 includes a frame 102 having a pair of axles 104, each axle having a wheel 106 rotatably attached. A container 108 is also attached to frame 102 to form a container assembly 109. A tow bar 110 is pivotably coupled to frame 102 by a connector 112 at a first end, the connector allowing the tow bar both to pivot and move laterally with respect to the frame. A hitch 24 (FIGS. 1, 9) at an opposing second end of tow bar 110 facilitates coupling of cart 100 to a typical lawn tractor (not shown) or other towing device. Cart 100 also includes a latch 26 having a biased pivotable lever 28 that is coupled to a slidable member 30. Details of latch 26 and its associated components are provided above and are illustrated in FIGS. 9 and 10A-10D. An arm 114 extends from container assembly 109 and is configured for latching the container assembly in a loading condition. In one embodiment, arm 114 extends from container 108 and through tow bar 110, a notched end 116 of the arm being selectably engaged by slidable member 30 to secure the arm to the tow bar. Cart 100 is otherwise similar to cart 10 and thus will not be detailed further here.

While this invention has been shown and described with respect to a detailed embodiment thereof, it will be understood by those skilled in the art that changes in form and detail thereof may be made without departing from the scope of the claims of the invention.

What is claimed is:

1. A tow bar assembly for selectively securing a container assembly of a dump cart in a loading condition, comprising:
   a tow bar rotatably connected to a frame of the dump cart, the tow bar having a receiving surface generally parallel to a longitudinal axis of the tow bar;
   a latch adjacent to the receiving surface, the latch comprising:
   a slidable member configured to selectively engage a distal portion of an arm, the arm extending from the container assembly and configured for latching the container assembly in the loading condition;

a biasing element configured to urge the slidable member into engagement with the distal portion to secure the container assembly; and a lever coupled to the tow bar and slidably coupled to the slidable member, the lever including an actuation plate spaced apart from the receiving surface of the tow bar;

wherein the lever, when actuated, moves the actuation plate toward the receiving surface and urges the slidable member away from the distal portion, enabling release of the engaged arm from the tow bar;

the container assembly being pivotable into an unloading condition on at least one axis with respect to the longitudinal axis of the tow bar upon release of the arm.

2. The tow bar assembly of claim 1, wherein at least a portion of the slidable member is located within the tow bar.

3. The tow bar assembly of claim 1, wherein the latch further includes an actuator pin connected to the slidable member and slidably coupled to the lever, the actuator pin configured to allow the slidable member to slide toward a first end of the tow bar when the actuation plate is released, and toward a second end of the tow bar when the actuation plate is actuated.

4. The tow bar assembly of claim 3, wherein the lever includes a pair of spaced-apart flanges extending generally perpendicular to the actuation plate and located adjacent to opposing sides of the tow bar.

5. The tow bar assembly of claim 4, wherein the flanges each include an actuator groove configured to receive the actuator pin, the actuator grooves being configured to cause slidable movement of the actuator pin during actuation and release of the actuation plate.

6. The tow bar assembly of claim 5, wherein the tow bar includes a pair of spaced-apart first guide grooves configured to receive the actuator pin, the first guide grooves being configured to allow the slidable member to slide during actuation and release of the actuation plate.

7. The tow bar assembly of claim 6, wherein the slidable member is slidably connected to the tow bar by a guide pin, the guide pin being configured to allow the slidable member to slide during actuation and release of the actuation plate.

8. The tow bar assembly of claim 7, wherein the slidable member includes at least one second guide groove configured to receive the guide pin, the second guide groove being configured to allow the slidable member to slide during actuation and release of the actuation plate.

9. The tow bar assembly of claim 8, wherein the slidable member slides generally parallel to the longitudinal axis of the tow bar as the actuation plate is moved toward and away from the receiving surface.

10. The tow bar assembly of claim 1, wherein the latch includes a plurality of spaced-apart biasing elements, which include said biasing element, located on opposing sides of the slidable member.

11. The tow bar assembly of claim 1, wherein the distal portion of the arm includes a notched portion.

12. The tow bar assembly of claim 11, wherein the slidable member further includes a protrusion, the protrusion being configured for selective engagement of the notched portion.

13. The tow bar assembly of claim 12, wherein the notched portion extends into the tow bar when the container assembly is secured thereto.

14. The tow bar assembly of claim 1, wherein the lever is pivotably coupled to the tow bar at a proximal end, and is biased by the biasing element such that the actuation plate forms a predetermined angle greater than zero from the proximal end to a distal end with respect to the receiving surface of the tow bar when the container assembly is in the loading condition.

15. The tow bar assembly of claim 14, wherein predetermined angle is decreased toward zero as the actuation plate is urged toward the receiving surface.

16. The tow bar assembly of claim 14, wherein the distal end of the lever, when the lever is actuated to enable unloading of the container assembly, rotates toward a first end of the tow bar.

17. The tow bar assembly of claim 1, further comprising a connector configured to attach a first end of the tow bar to the frame, the connector configured to allow the container assembly to pivot on at least one axis with respect to the longitudinal axis of the tow bar when the arm is released from the tow bar.

18. The tow bar assembly of claim 1, further comprising a hitch attached to a second end of the tow bar.

19. A tow bar assembly for selectively securing a container assembly of a dump cart in a loading condition, comprising:

a tow bar rotatably connected at a first end to a frame of the dump cart, the tow bar having a receiving surface generally parallel to a longitudinal axis of the tow bar;

a latch adjacent to the receiving surface, the latch comprising:

a slidable member configured to selectively engage a distal portion of an arm, the arm extending from the container assembly and configured for latching the container assembly in a loading condition;

a biasing element configured to urge the slidable member into engagement with the distal portion to secure the container assembly; and a lever pivotably coupled to the tow bar and slidably coupled to the slidable member, the lever including an actuation plate urged by the biasing element to be spaced apart at an angle greater than zero from the receiving surface of the tow bar;

wherein the lever, when actuated, moves the actuation plate toward the receiving surface and urges the slidable member away from the distal portion, enabling release of the engaged arm from the tow bar;

the container assembly being pivotable into an unloading condition on at least one axis with respect to the longitudinal axis of the tow bar upon release of the arm.

* * * * *